US006404522B1

(12) United States Patent
Handelman

(10) Patent No.: US 6,404,522 B1
(45) Date of Patent: Jun. 11, 2002

(54) OPTICAL COMMUNICATION METHOD AND SYSTEM USING WAVELENGTH DIVISION MULTIPLEXING

(76) Inventor: Doron Handelman, 14 Hamaavak Street, Givatayim (IL), 53520

(*) Notice: Subject to any disclaimer, the term of this patent is extended or adjusted under 35 U.S.C. 154(b) by 0 days.

(21) Appl. No.: 09/126,378

(22) Filed: Jul. 30, 1998

(30) Foreign Application Priority Data

May 25, 1998 (IL) .................................................. 124639

(51) Int. Cl.[7] .............................................. H04J 14/02

(52) U.S. Cl. ........................ 359/124; 359/125; 359/133

(58) Field of Search ................................. 359/124, 125, 359/133

(56) References Cited

U.S. PATENT DOCUMENTS

| 4,626,075 A | * | 12/1986 | Chelma ....................... 350/354 |
| 5,170,273 A | | 12/1992 | Nishio ......................... 359/128 |
| 5,191,457 A | | 3/1993 | Yamazaki ..................... 359/124 |
| 5,194,977 A | | 3/1993 | Nishio ......................... 359/128 |
| 5,400,322 A | | 3/1995 | Hunt et al. |
| 5,452,115 A | * | 9/1995 | Tomioka ...................... 359/114 |
| 5,457,687 A | * | 10/1995 | Newman |
| 5,479,447 A | | 12/1995 | Chow et al. .................. 375/260 |
| 5,557,439 A | | 9/1996 | Alexander et al. ........... 359/130 |
| 5,680,490 A | | 10/1997 | Cohen et al. .................. 385/24 |
| 5,712,932 A | | 1/1998 | Alexander et al. ............. 385/24 |
| 5,724,167 A | * | 3/1998 | Sabella ........................ 359/128 |
| 5,739,935 A | * | 4/1998 | Sabella ........................ 359/128 |
| 5,774,244 A | * | 6/1998 | Tandon et al. ............... 359/125 |
| 5,867,289 A | * | 2/1999 | Gertsel ........................ 359/110 |
| 6,108,112 A | * | 8/2000 | Touma ........................ 359/110 |
| 6,233,082 B1 | * | 5/2001 | Johnson ...................... 359/237 |

OTHER PUBLICATIONS

Multiple wavelengths exploit fiber capacity, Eric Lerner, Laser Focus World, Jul. 1997, pp. 119–125.
Technologies for Local–Access Fibering, Yukou Mochida, IEEE Communications Magazine, Feb. 1994, pp. 64–73.
Wavelength–Division Multiplexed Systems and Applications, The Communications Handbook, IEEE Press, 1997, pp. 883–890.
Terabit/secon–transmission demonstrations make a splash at OFC '96, Laser Focus World, Apr. 1996, p. 13.
Multigigabit Networks: The Challenge, IEEE LTS, May 1992, pp. 16–26.
Direct Detection Lightwave Systems: Why Pay More?, Paul E. Green and Raviv Ramaswami, IIIELCS, Nov. 1990, pp. 36–49.

(List continued on next page.)

Primary Examiner—Leslie Pascal

(57) ABSTRACT

The present invention provides for an improvement in communication performance of an optical communication system which communicates data via N different channel wavelengths using WDM. In a case that not all of the N channel wavelengths are carrying data simultaneously, a switching unit may route data signals to selected channel wavelengths, selected to increase channel spacing between as many as possible channel wavelengths. In a case that time dependent changes, such as temperature changes, cause degradation in communication performance, channel hopping may be performed. Alternatively or additionally, a data rate reduction of data carried over interfered channels may be also performed. In a case that actual capacities of at least some of the N channels are lower than a maximum attainable channel capacity, channel condensation may be performed. The present invention also provides for a system combining channels at a bandwidth between 1.52 micrometer and 1.62 micrometer with a channel operating at 1.31 micrometer.

33 Claims, 7 Drawing Sheets

OTHER PUBLICATIONS

WDM Local Area Networks, Leonid G. Kazovsky et al, IEEE LTS, May 1992, pp. 8–15.

Photonics in Switching, H. Scott Hinton, IEEE LTS, Aug. 1992, pp. 26–35.

Advanced Technology for Fiber Optic Switching Systems, Hiromu Toba and Nori Shibata, IEEE LTS, Nov. 1992, pp. 12–18.

Mining the Optical Bandwidth for a Terabit per second, Alan Willner, IEEE Spectrum, Apr. 1997, pp. 32–41.

Record data–transmission rate reported at ECOC '96, Laser Focus World, Nov. 1996, pp. 40–41.

Multistage Amplifier Provides Gain across 80 nm, Laser Focus World, Sep. 1997, pp. 23–24.

Fiber Amplifiers expand network capacities, Eric Lerner, Laser Focus World, Aug. 1997, pp. 85–96.

Wavelength Assignment in Multiphop Lightwave Networks, Aura Ganz et al, IEEE Transactions on Communications, vol. 42, No. 7, Jul. 1994, pp. 246–2469.

Wavelength–Division Switching Technology in Photonic Switching Systems, Suzuki et al, IEEE International Conference on Communications, ICC 1990, pp. 1125–1129.

Branch–Exchange Sequences for Reconfiguration of Lightwave Networks, Labourdette et al, IEEE Transactions on Communications, vol. 42, No. 10, Oct. 1994, pp. 2822–2832.

Use of Delegated Tuning and Forwarding in Wavelength Division Multiple Access Networks, Auerbach et al, IEEE Transactions on Communications, vol. 43, No. 1, Jan. 1995, pp. 52–63.

* cited by examiner

OPTICAL COMMUNICATION METHOD AND SYSTEM USING WAVELENGTH DIVISION MULTIPLEXING

FIELD OF THE INVENTION

The present invention relates to optical communication generally, and more particularly to optical communication utilizing wavelength division multiplexing (WDM).

BACKGROUND OF THE INVENTION

Today, the telecommunication industry is experiencing growth in demand for communication services and such demand is further expected to grow in the future. One of the ways to meet such demand is by expanding capacity of information carried over fiber optic cables in optical communication systems. One of the most advanced ways of achieving such expansion today is by using wavelength division multiplexing (WDM) for transmitting simultaneously multiple signals at different wavelengths over the same fiber optic cable.

The concept of WDM is based on the theory that a discrete light frequency can carry its own unique package of information. Thus, for example, two separate frequencies that carry data can be combined and transmitted in a combined form along a fiber optic cable to a receiving end. At the receiving end the two frequencies can be received and separated, and the data carried by each separate frequency can be regenerated. Based on this concept, the first systems that employed WDM multiplexed and demultiplexed signals at wavelengths of 1310 nanometer (nm) and 1550 nm (1.0 nanometer is $1.0*10-9$ meter or $1.0-3$ micrometer).

The advent of wide-band optical amplifiers made WDM of many wavelengths onto the same fiber optic cable practical since a plurality of wavelengths in an operating bandwidth of a wide-band optical amplifier could be amplified simultaneously by the same amplifier. With wide-band optical amplifiers being available, communication over long distances can be implemented.

A common wide-band optical amplifier which is commercially available today is the Erbium Doped Fiber Amplifier (EDFA) which has an operating bandwidth around 1550 nm. Wide-band optical amplifiers at 1310 nm are not yet commercially available today, although development of such optical amplifiers continues.

Other elements of a WDM based system, such as multiplexers/demultiplexers, optical transmitters, optical receivers and tunable optical filters, exist today and are commercially available. However, there are still several problems that have to be resolved in order to provide reliable optical communication systems which utilize WDM.

One of the problems which typically arises in systems utilizing dense wavelength division multiplexing (DWDM) of several tens of channels or more relates to spacing of channel wavelengths. If channel wavelengths are not spaced an adequate distance apart, drifts in wavelength characteristics of optoelectric components over time may cause interference between channel wavelengths. The drifts may be generated, for example, due to a change in temperature. Such drifts are typically of a low frequency type.

Other problems relate to wavelength stability of the optical transmitters, and to degradation and interference effects arising from use of non-ideal fiber optic cables. Such effects include, for example, dispersion, self-phase modulation, and cross-phase modulation.

Descriptions of optical communication systems utilizing WDM and of elements of such communication systems are found in the following publications:

An article titled "Mining the Optical Bandwidth for a Terabit per Second", by Alan Eli Willner, in IEEE Spectrum, April 1997, pp. 32–41;

An article titled "Record Data Transmission Rate Reported at ECOC 96", by Paul Mortensen, Laser Focus World, November 1996, pp. 40–42;

An article titled "Multiple Wavelengths Exploit Fiber Capacity", by Eric J. Lerner, Laser Focus World, July 1997, pp. 119–125;

An article titled "Advances in Dense WDM Push Diode-Laser Design", by Diana Zankowsky, Laser Focus World, August 1997, pp. 167–172;

An article titled "Multistage Amplifier Provides Gain Across 80 nm", by Kristin Lewotesky, Laser Focus World, September 1997, pp. 22–24;

The Communications Handbook, CRC Press & EEE Press, 1997, Editor-in-Chief Jerry D. Gibson, Section 65, pp. 883–890; and An article titled "WDM Local Area Networks", by Kazovsky et al., IEEE LTS, May 1992, pp. 8–15.

Additionally, in U.S. Pat. No. 5,170,273 to Nishio there is described a cross-talk reducing optical switching system which receives electrical digital signals at its input terminal.

U.S. Pat. No. 5,191,457 to Yamazaki describes a VWDM optical communication network in which optical beams are modulated by channel discrimination signals of different frequencies.

U.S. Pat. No. 5,194,977 to Nishio describes a wavelength division switching system with reduced optical components using optical switches.

U.S. Pat. No. 5,557,439 to Alexander et al. describes wavelength division multiplexed optical communication systems configured for expansion with additional optical signal channels.

U.S. Pat. No. 5,680,490 to Cohen et al. describes a comb splitting system which demultiplexes and/or multiplexes a plurality of optical signal channels at various wavelengths.

U.S. Pat. No. 5,712,932 to Alexander et al. describes reconfigurable wavelength division multiplexed systems which include configurable optical routing systems.

The disclosures of all references mentioned above and throughout the present specification are hereby incorporated herein by reference.

SUMMARY OF THE INVENTION

The present invention seeks to provide a method and system for improving communication performance in optical communication systems utilizing WDM.

In the present invention, an optical communication system utilizing WDM converts data provided over up to N channels to optical signals which are communicated over at least some of N channel wavelengths corresponding to the N channels. The N channel wavelengths are spaced $S_1$ nm from each other.

Communication performance of the optical communication system may be improved in any of the following cases and in any combination thereof:

(1) not all the N channels are carrying data simultaneously and communication performance of some channels that carry data is low;

(2) time dependent changes, such as temperature changes, cause degradation in communication performance; and (3) actual capacities of at least some of the N channels are lower than a maximum attainable channel capacity and communication performance of some of the channels that carry data is low.

In the case that the optical communication system is only partially loaded, i.e. only K out of the N channels carry data, the K channels carrying data are detected at a switching unit which forms part of the optical communication system.

After the K channels carrying data are detected at the switching unit, a controller at the switching unit calculates a channel spacing $S_2$ which is greater than $S_1$. Additionally, the controller also computes a number NCW, where NCW characterizes a distribution of channel wavelengths in which NCW channel wavelengths in a sub-group of K channel wavelengths corresponding to the K channels are spaced at least $S_2$ nm from at least one nearest neighbor channel wavelength in the sub-group of K channel wavelengths.

After computing the values of NCW and $S_2$, tile controller uses the values of NCW and $S_2$ to select a sub-group of K optical transmitters to be used for transmission of the data carried over the K channels. Selection of the sub-group of K optical transmitters is performed by sequentially determining a number of NCW optical transmitters which transmit at channel wavelengths spaced $S_2$ nm from each other, and then determining the rest of K-NCW optical transmitters which transmit at channel wavelengths that are not spaced $S_2$ nm from each other.

After determination of the sub-group of K optical transmitters, the controller provides to a router control signals identifying the selected sub-group of K optical transmitters. The router routes the data carried over the K channels to the sub-group of K optical transmitters for transmission thereby.

The selection of the sub-group of K optical transmitters generally enables transmission of the data over channel wavelengths spaced at an increased channel spacing with respect to an initial channel spacing. This reduces interference effects and improves communication performance.

In the case that time dependent changes, such as temperature changes, cause degradation in communication performance, K out of N channels that carry data are detected and routed to K optical transmitters for transmission of the data carried over the K channels from a transmitting end of the optical communication system to a receiving end of the optical communication system. The transmission is performed by the K optical transmitters over K channel wavelengths corresponding to the K channels.

If a quality of reception of data received over at least one of the K channel wavelengths at the receiving end is determined to be below a threshold, a reception indicator indicating that the quality of reception of data received over at least one of the K channel wavelengths at the receiving end is below the threshold is transmitted back to the transmitting end.

When the reception indicator is received at the transmitting end, a channel hop is performed from the at least one of the K channel wavelengths to at least one unoccupied channel wavelength at the transmitting end and at the receiving end in synchronization.

If, in addition to a low quality of reception of data received over at least one of the K channel wavelengths at the receiving end, actual capacities of at least some of the N channels are lower than a maximum attainable channel capacity, a bit rate of the data carried over the at least one of the K channels whose reception is determined to be below the threshold may be reduced at the transmitting end in addition to performance of the channel hop. Alternatively, channel hop may be prevented, and improvement of communication performance may be achieved by reduction of the bit rate only.

The optical communication system may also employ different wavelength bands for transmission of data signals and control signals. The data signals are generated at different wavelengths in a wavelength range between 1.52 micrometer and 1.62 micrometer. The control signals are generated at a wavelength around 1.31 micrometer. Then, the control signals and the data signals are multiplexed in a wavelength division multiplexer for transmission in a wavelength division multiplexed form.

When the optical communication system is used in full capacity, a channel hop, if required, may be performed from a data channel in the wavelength range between 1.52 micrometer and 1.62 micrometer to the control channel operating at a wavelength around 1.31 micrometer.

There is thus provided in accordance with a preferred embodiment of the present invention a method of transmitting data carried over K channels via an optical transmission system including a group of N optical transmitters transmitting at channel wavelengths spaced at least $S_1$ nm from each other, where K is less than N, the method including detecting the K channels carrying data, and routing the K channels to a sub-group of K optical transmitters selected from the group of N optical transmitters to provide a distribution of the K optical transmitters in which a highest number of optical transmitters in the sub-group transmit at channel wavelengths spaced at least $S_2$ nm from channel wavelengths used by at least one nearest neighbor optical transmitter in the sub-group, where $S_2$ is greater than $S_1$. Preferably, $S_2=S_1*(N/K+1)$.

Additionally, the method also includes the steps of determining that a quality of reception of data received over at least one of K channel wavelengths at a receiving end is below a threshold, wherein the K channel wavelengths respectively correspond to the K channels, transmitting to the optical transmission system in response to the determining step, a reception indicator indicating that the quality of reception of data received over the at least one of the K channel wavelengths at the receiving end is below the threshold, and hopping from the at least one of the K channel wavelengths to at least one unoccupied channel wavelength at the transmission system and at the receiving end in synchronization.

Preferably, the at least one unoccupied channel wavelength is spaced at least $S_2$ nm from the at least one of the K channel wavelengths.

Further preferably, each optical transmitter in the group of N optical transmitters operates at a wavelength in a wavelength range between 1.52 micrometer and 1.62 micrometer, and the transmitting step includes the step of transmitting the reception indicator over a control channel operating at a wavelength around 1.31 micrometer.

Preferably, each optical transmitter in the group of N optical w transmitters operates at a wavelength in a wavelength range between 1.52 micrometer and 1.62 micrometer, and the hopping step includes the step of hopping from the at least one of the K channel wavelengths to at least one channel wavelength centered around 1.31 micrometer at the optical transmission system and at the receiving end in synchronization.

Additionally, the method also includes the steps of determining that a quality of reception of data received over at least one of K channel wavelengths at a receiving end is below a threshold, wherein the K channel wavelengths respectively correspond to the K channels, transmitting to the optical transmission system, in response to the determining step, a reception indicator indicating that the quality of reception of data received over the at least one of the K channel wavelengths at the receiving end is below the threshold, and reducing a data rate of the data carried over the at least one of the K channel wavelengths at the optical transmission system.

The method also preferably includes the step of condensing L radio frequency (RF) channels carrying data into the K channels prior to the detecting step, wherein L is greater than K and less than or equal to N. Preferably, the condensing step includes the step of transferring data carried over L–K channels to the K channels thereby increasing a data rate of data carried over at least one of the K channels.

There is also provided in accordance with a preferred embodiment of the present invention a method of transmitting data carried over K out of N channels to be employed in an optical data communication system adapted to use N optical transmitters for transmitting information from a transmitting end of the communication system to a receiving end of the communication system using WDM, the method including the steps of detecting the K channels carrying data, routing the K channels to K optical transmitters for transmission of the data carried over the K channels by the K optical transmitters over K channel wavelengths corresponding to the K channels, wherein the K optical transmitters are selected from the N optical transmitters, determining that a quality of reception of data received over at least one of the K channel wavelengths at the receiving end is below a threshold, transmitting to the transmitting end, in response to the determining step, a reception indicator indicating that the quality of reception of data received over the at least one of the K channel wavelengths at the receiving end is below the threshold, and hopping from the at least one of the K channel wavelengths to at least one unoccupied channel wavelength at the transmitting end and at the receiving end in synchronization.

Preferably, each of the N optical transmitters operates at a wavelength in a wavelength range between 1.52 micrometer and 1.62 micrometer, and the transmitting step includes the step of transmitting the reception indicator over a control channel operating at a wavelength around 1.31 micrometer.

Further preferably, each of the N optical transmitters operates at a wavelength in a wavelength range between 1.52 micrometer and 1.62 micrometer, and the hopping step includes the step of hopping from the at least one of the K channel wavelengths to at least one channel wavelength centered around 1.31 micrometer at the transmitting end and at the receiving end in synchronization.

Additionally, the method also includes the step of reducing a data rate of the data carried over the at least one of the K channel wavelengths at the transmitting end in response to the determining step.

Further in accordance with a preferred embodiment of the present invention there is also provided a method of transmitting data carried over K out of N channels to be employed in an optical data communication system adapted to use N optical transmitters for transmitting information from a transmitting end of the communication system to a receiving end of the communication system using WDM, the method including detecting the K channels carrying data, routing the K channels to K optical transmitters for transmission of the data carried over the K channels by the K optical transmitters over K channel wavelengths corresponding to the K channels, wherein the K optical transmitters are selected from the N optical transmitters, determining that a quality of reception of data received over at least one of the K channel wavelengths at the receiving end is below a threshold, and reducing a data rate of data carried over the at least one of the K channel wavelengths at the transmitting end in response to the determining step.

There is also provided in accordance with a preferred embodiment of the present invention a transmission method for use in a WDM optical data communication system, the method including generating data signals at different wavelengths in a wavelength range between 1.52 micrometer and 1.62 micrometer, generating control signals at a wavelength around 1.31 micrometer for controlling transmission of the data signals, and multiplexing the data signals and the control signals for transmission in a wavelength division multiplexed form.

Additionally, the method also includes the steps of detecting K channel wavelengths carrying the data signals, and routing the K channel wavelengths to a sub-group of K optical transmitters, selected from a group of N optical transmitters operating at channel wavelengths spaced at least $S_1$ nm from each other, to provide a distribution of the K optical transmitters in which a highest number of optical transmitters in the sub-group transmit at channel wavelengths spaced at least $S_2$ nm from channel wavelengths used by at least one nearest neighbor in the sub-group, where $S_2$ is greater than $S_1$.

There is also provided in accordance with a preferred embodiment of the present invention a switching unit for use in an optical data communication system which communicates data provided over N channels via N different channel wavelengths spaced at least $S_1$ nm from each other, the switching unit including N data sensors, each operatively associated with one of the N channels, and each operative to generate an indication in response to detection of data carried over a channel associated therewith, a router operative to selectively route signals, and a controller operatively associated with the N data sensors and the router and operative to receive from K data sensors K indications indicating that a first sub-group of K out of the N channels carry data, and to provide to the router at least identification signals determining a second sub-group of K channels, the second sub-group of K channels corresponding to a sub-group of K out of the N channel wavelengths used by K optical transmitters to transmit the data carried over the K channels.

Preferably, the second sub-group of K channels is selected based on a selection of the corresponding sub-group of K channel wavelengths which provides a distribution of channel wavelengths characterized by that a highest number of channel wavelengths in the corresponding sub-group of K channel wavelengths are spaced at least $S_2$ nm from at least one nearest neighbor channel wavelength in the sub-group of K channel wavelengths, where $S_2$ is greater than $S_1$. Further preferably, $S_2=S_1*(N/K+1)$.

Preferably, the N data sensors, the router, and the controller are included in a single integrated circuit.

Additionally, the switching unit also includes a receiver operatively associated with the controller and operative to receive a reception indicator indicating that a quality of reception of data received over at least one of the K channel wavelengths at a receiving end is below a threshold, wherein the controller is also operative to determine a channel hop from the at least one of the K channel wavelengths to at least one unoccupied channel wavelength.

Additionally or alternatively, the controller is also operative to cause a reduction of a data rate of the data carried over the at least one of the K channel wavelengths in response to reception of the reception indicator.

Preferably, each of the N channel wavelengths is included in a wavelength range between 1.52 micrometer and 1.62 micrometer, and the receiver is operative to receive the reception indicator over a control channel wavelength operating at a wavelength around 1.31 micrometer. Further preferably, the controller is operative to determine the channel hop from the at least one of the K channel wavelengths to at least one channel wavelength operating at a wavelength around 1.31 micrometer.

Preferably, the router is operatively associated with N optical transmitters transmitting over the N channel wavelengths, and the router is also operative to selectively route signals for modulating at least one of input currents to and output beams of K out of the N optical transmitters under control of the controller, the K optical transmitters being associated with the K channel wavelengths.

Alternatively or additionally, the N channels are operatively associated with N optical receivers, the router is operatively associated with the N optical receivers and the router is also operative to selectively route signals received from at least some of the N optical receivers, and the controller is also operative to provide to the router identification signals determining K out of the N optical receivers associated with the K channel wavelengths.

Preferably, the controller is also operative to provide to the router the data carried over the K channels.

There is also provided in accordance with a preferred embodiment of the present invention transmission apparatus in a WDM optical data communication system, the apparatus including a plurality of optical transmitters generating optical signals in a wavelength range between 1.52 micrometer and 1.62 micrometer, each being operative to generate data signals at a different wavelength in the wavelength range, a control data optical transmitter generating optical signals at a wavelength around 1.31 micrometer and operative to generate control signals for controlling transmission of the data signals, and a wavelength division multiplexer operatively associated with the plurality of optical transmitters and the control data optical transmitter and operative to multiplex the data signals and the control signals for transmission in a wavelength division multiplexed form.

Additionally, the transmission apparatus also includes a switching unit operative, when some of the plurality of optical transmitters are not used to transmit the data signals, to selectively distribute the data signals between at least one of the control data optical transmitter and optical transmitters which are used to transmit the data signals.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
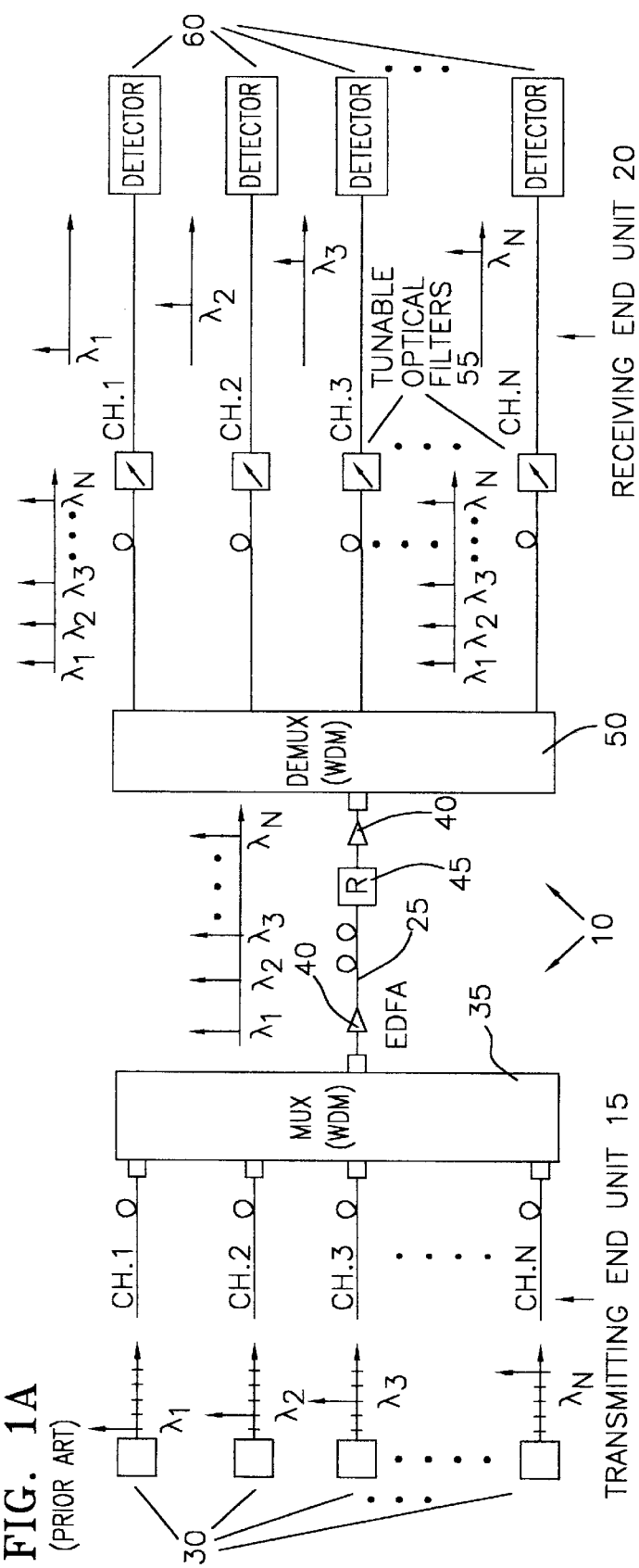
FIG. 1A is a generalized block diagram illustration of a prior art optical communication system employing wavelength division multiplexing of data carried over multiple channels.
Figure 1B:
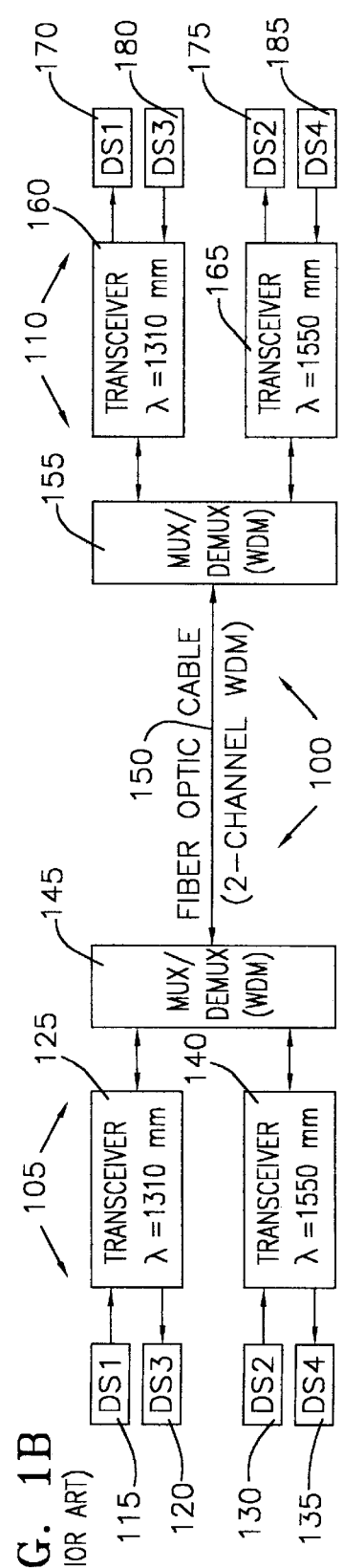
FIG. 1B is a generalized block diagram illustration of another prior art optical communication system employing wavelength division multiplexing of data carried over two channels.

Reference is now made to FIGS. 1A and 1B which are generalized block diagram illustrations of prior art optical communication systems employing wavelength division multiplexing.

In FIG. 1A, a prior art optical communication system 10 includes a transmitting end unit 15, a receiving end unit 20 and a high-bandwidth fiber optic cable 25 coupling the transmitting end unit 15 to the receiving end unit 20. Since the optical communication system 10 typically employs duplex communication, each side of the optical communication system 10 typically includes both the transmitting end unit 15 and the receiving end unit 20. For simplicity, the description herein below refers only to one communication direction from the transmitting end unit 15 to the receiving end unit 20, but it is appreciated that the same description may be used in the opposite direction.

At the transmitting end unit 15, a series of N diode lasers 30, typically distributed feedback (DFB) lasers, emit light at different channel wavelengths $\lambda_1, \lambda_2, \lambda_3, \ldots \lambda_N$. Generally, two main methods are used to modulate the N diode lasers so as to generate and transmit optical information signals at high data rates.

A first method includes direct injection current modulation in which an input current to a diode laser is modulated just above and below its threshold current for lasing to provide corresponding ON (light is emitted) and OFF (light is not emitted) states. Accordingly, an electronic bit stream inputted to the diode laser is converted into an optical bit stream. For speeds under one gigabit per second (1 Gb/s) direct injection current modulation is the preferred method.

A second method includes external modulation of an output beam of a diode laser. In this method, the laser is left in its ON state continuously, and a commercially available optical modulator, such as a Lithium Niobate crystal, is used to chop and modulate the output beam as it exits the diode laser active cavity thereby blocking/transferring light emitted from the diode laser. The external modulation is typically suitable for speeds on the order of several tens of gigabits per second.

Typically, beams including optical information signal which emanate from the series of diode lasers 30 are coupled onto the fiber optic cable 25 by a wavelength division multiplexer 35 to provide a wavelength multiplexed signal. The wavelength multiplexed signal is amplified by Erbium Doped Fiber Amplifiers (FDFA) 40 which are inserted at the transmitting end unit 15, at repeaters 45 distributed along the cable 25, and at the receiving end unit 20.

At the receiving end unit 20, the beams of light at the different channel wavelengths $\lambda_1, \lambda_2, \lambda_3, \ldots \lambda_N$ arriving from the transmitting end unit 15 are demultiplexed at a wavelength division demultiplexer 50 which is typically similar to the multiplexer 35. The multiplexer 35 and the demultiplexer 50 are typically conventional star couplers as is well known in the art.

The beams of light demultiplexed at the demultiplexer 50 are provided to a series of N tunable optical filters 55 which are coupled to a series of N optical detectors 60. Each tunable optical filter in the series of N tunable optical filters 55 is operative to tune a detector in the series of N optical detectors 60 to a specific channel wavelength by filtering all other channel wavelengths.

The number N of channel wavelengths multiplexed by wavelength division multiplexing is typically on the order of several tens. In an article titled "Record Data Transmission Rate Reported at ECOC 96", by Paul Mortensen, Laser Focus World, November 1996, pp. 40–42 which is incorporated herein by reference, a record wavelength division multiplexing of 132 channel wavelengths has been reported.

All the elements of the optical communication system 10 are commercially available today. Specifically, the series of diode lasers 30 typically includes distributed feedback lasers (DFB) which are employed as optical transmitters transmitting at different wavelengths in a bandwidth around 1550 nm. The series of tunable optical filters 55 typically includes acusto-optic filters or tunable interferometers, such as Fabry-Perot interferometers. The series of optical detectors 60 typically includes photodetectors, such as avalanche photodiodes (APDs) or P-I-N photodiodes.

In FIG. 1B, a prior art optical communication system 100 includes a first end unit 105, a second end unit 110 and a fiber optic cable 150 coupling the first end unit 105 to the second end unit 110.

At the first end unit 105, a data transmitter 115 and a data receiver 120 are coupled to an optical transceiver 125 operating at a wavelength around 1310 nm. Similarly, a data transmitter 130 and a data receiver 135 are coupled to an optical transceiver 140 operating at a wavelength around 1550 nm. The term "transceiver" is used throughout the specification and claims to include a combination of a transmitter and a receiver.

The data transmitters 115 and 130 are typically employed to drive the optical transmitter portions of the optical transceivers 125 and 140 respectively. The data receivers 120 and 135 are typically employed to receive output electric signals from the optical receiver portions of the optical transceivers 125 and 140 respectively.

Optical signals at 1310 nm emanating from the transceiver 125 and optical signals at 1550 nm emanating from the transceiver 140 are multiplexed at a wavelength division multiplexer/demultiplexer 145 and transmitted over the fiber optic cable 150. At the second end unit 110, the optical signals arriving from the first end unit 105 are demultiplexed at a wavelength division multiplexer/demultiplexer 155 and provided to an optical transceiver 160 operating at a wavelength around 1310 nm and to an optical transceiver 165 operating at a wavelength around 1550 nm.

At the optical receiver portion of the transceiver 160, the optical signals at 1310 nm are extracted by filtering the optical signals at 1550 nm and converted to electric signals which are provided to a data receiver 170. At the optical receiver portion of the transceiver 165, the optical signals at 1550 nm are extracted by filtering the optical signals at 1310 nm and converted to electric signals which are provided to a data receiver 175.

In the opposite direction, data transmitters 180 and 185 are typically employed to drive the optical transmitter portions of the optical transceivers 160 and 165 respectively. Optical signals at 1310 nm emanating from the transceiver 160 and optical signals at 1550 nm emanating from the transceiver 165 are multiplexed at the multiplexer/demultiplexer 155 and transmitted over the fiber optic cable 150 to the first end unit 105. At the first end unit 105, the optical signals arriving from the second end unit 110 are demultiplexed at the wavelength division multiplexer/demultiplexer 145 and provided to the receiver portions of the optical transceivers 125 and 140.

At the optical receiver portion of the transceiver 125, the optical signals at 1310 nm are extracted by filtering the optical signals at 1550 nm and converted to electric signals which are provided to the data receiver 120. At the optical receiver portion of the transceiver 140, the optical signals at 1550 nm are 3 extracted by filtering the optical signals at 1310 nm and converted to electric signals which are provided to the data receiver 135.

The multiplexing of the wavelengths 1310 nm and 1550 nm doubles the capacity of the fiber optic cable 150. However, since optical amplifiers at 1310 nm are not commercially available today, the optical communication system 100 can be implemented only in cases which do not require amplification, such as in cable-TV systems communicating over short distances. When communicating over long distances, the optical communication system 10 of FIG. 1A rather than the optical communication system 100 can be implemented because amplification, which is necessary over long distances, is available only at a wavelength range around 1550 nm through use of EDFAs.

Figure 2:
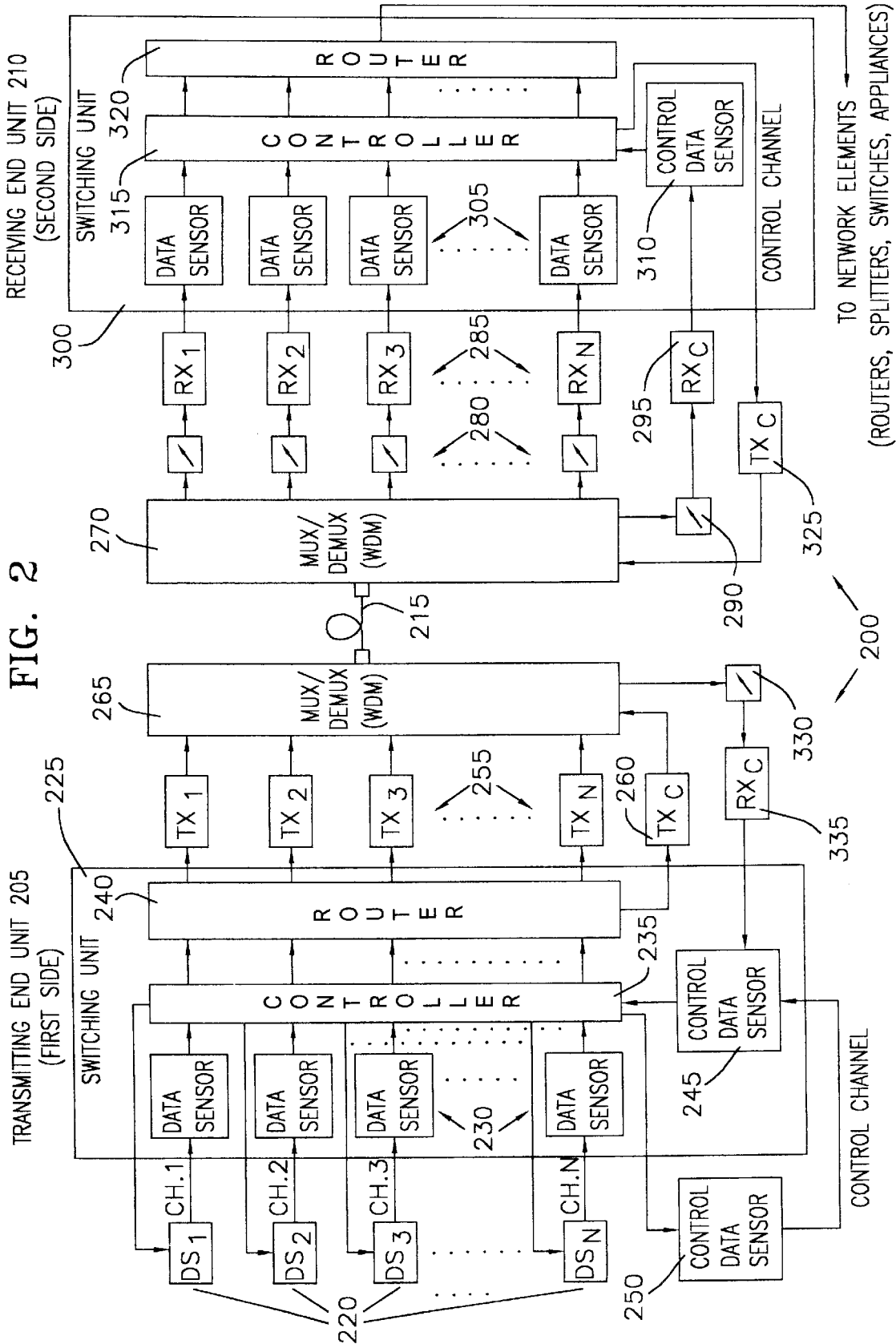
FIG. 2 is a generalized block diagram illustration of a preferred implementation of an optical communication system constructed and operative in accordance with a preferred embodiment of the present invention.

Reference is now made to FIG. 2 which is a generalized block diagram illustration of a preferred implementation of an optical communication system 200 constructed and operative in accordance with a preferred embodiment of the present invention.

Preferably, the optical communication system 200 includes a transmitting end unit 205, a receiving end unit 210, and a high-bandwidth fiber optic cable 215 operatively associating the transmitting end unit 205 with the receiving end unit 210. It is appreciated that the present invention is not limited to fiber optic cables, and any appropriate optical wave-guide or optical transmission line may alternatively be employed to operatively associate the transmission end unit 205 with the receiving unit 210.

The optical communication system 200 typically employs duplex communication. Therefore, each side of the optical communication system 200 is both a transmitting end and a receiving end and typically includes the transmitting end unit 205 as well as the receiving end unit 210 to enable transmission and reception of data simultaneously. However, for simplicity, the description herein below refers only to simplex communication in which data is transmitted from the transmitting end unit 205 at a first side to the receiving end unit 210 at a second side. It is appreciated however that the present invention is not limited to simplex communication, and the same description may be used for duplex communication in which data is also transmitted from a transmitting end unit at the second side which corresponds to the transmitting end unit 205 to a receiving end unit at the first side which corresponds to the receiving end unit 210.

It is further appreciated that the description herein below also refers to two-way communication of control signals regardless of whether the communication is simplex or duplex. Thus, control signals are shown to be provided from the first side to the second side and from the second side back to the first side.

Preferably, the transmitting end unit 205 includes N data sources 220 which transmit electronic data signals over N channels. The N data sources 220 are preferably operatively associated, via the N channels, with N data sensors 230 which are comprised in a switching unit 225. It is appreciated that the N data sensors 230 may include any appropriate conventional circuitry that senses current or voltage changes indicating passage of data over the N channels, or some of the N channels.

Preferably, each of the N data sensors 230 is operative to generate an indication in response to detection of data carried over a channel associated therewith. The N data sensors 230 are preferably operatively associated with a controller 235 which is also comprised in the switching unit 225. The controller 235 may preferably include any appropriate conventional micro-controller or micro-processor as is well known in the art.

Preferably, the controller 235 is operative to receive indications from any of the N data sensors 230 that detect data carried over the channels associated therewith. The controller 235 preferably processes the indications and outputs control signals controlling operation of a router 240 which is operatively associated with the controller 235 and is also comprised in the switching unit 225. It is appreciated that the controller 235 may also direct the data carried over the N channels to the router 240.

Preferably, the switching unit 225 may also include a control data sensor 245 for use in applications involving transmission of optical signals at a channel wavelength of 1310 nm as described herein below. The control data sensor 245 is operatively associated with the controller 235 and a control data source 250, and is operative to generate an indication in response to detection of control data transmitted from the control data source 250 via a control channel associated with the controller 235 and the control data sensor 245. The control data is preferably processed by the controller 235 and provided to the router 240.

It is appreciated that the N data sensors 230, the controller 235, the router 240, and the control data sensor 245 may be comprised in a single integrated circuit. Alternatively or additionally, the N data sensors 230 may be comprised in a single sensor device (not shown) including a data sensor which scans all the N channels and generates addressed indications indicating data passage via channels, and channel numbers or channel addressing codes corresponding to the channels via which the data passes.

The router 240 is preferably operative to selectively route the electronic data signals originating from the data sources 220 to at least some of N optical transmitters 255 in accordance with directing instructions received from the controller 235. It is appreciated that the electronic data signals are typically used to modulate the N optical transmitters 255 either through direct injection current modulation or through external modulation, as mentioned above with reference to FIG. 1A. It is further appreciated that direct injection current modulation may be used for some of the N optical transmitters 255, and external modulation may be used for the rest of the N optical transmitters 255. The term "optical transmitter" is used throughout the specification and claims to include a light source, preferably a diode laser, as well as circuitry used for driving the light source and an external modulator including circuitry used for driving the external modulator in a case in which external modulation is employed.

Preferably, control data signals originating from the control data source 250 are routed by the router 240 to a control data optical transmitter 260 in accordance with instructions received from the controller 235. It is appreciated that the control data signals are typically used to modulate the control data optical transmitter 260 in one of the methods mentioned above for the N optical transmitters 255.

Since each of the N optical transmitters 255 is driven, directly or externally, by electronic data signals generated by one of the data sources 220, the electronic data signals are converted to optical data signals and the N channels respectively correspond to N channel wavelengths over which the N optical transmitters 255 transmit the optical data signals. Similarly, the control data signals are converted to optical control data signals and the control channel corresponds to a control channel wavelength over which the optical transmitter 260 transmits the optical control data signals.

Preferably, the N channel wavelengths over which the N optical transmitters 255 transmit the optical data signals are spaced at least $S_1$ nm from each other, where $S_1$, typically referred to as channel spacing, typically ranges between 0.4 nm and 4 nm (50 to 500 GHz).

The optical data signals transmitted over the N channel wavelengths are preferably multiplexed at a wavelength division multiplexer/demultiplexer 265 thereby generating a multiple-channel optical signal combining beams of light at different channel wavelengths $\lambda_1, \lambda_2, \lambda_3, \ldots \lambda_N$. It is appreciated that if control data signals are transmitted over the control channel, the control data signals are also multiplexed at the multiplexer/demultiplexer 265.

Preferably, the multiplexer/demultiplexer 265 is operatively associated with the fiber optic cable 215, and the multiple-channel optical signal is preferably transmitted over the fiber optic cable 215 to the receiving end unit 210. It is appreciated that the multiplexer/demultiplexer 265 may be a conventional passive combiner or star coupler.

If the N optical transmitters 255 and the optical transmitter 260 operate at channel wavelengths in a wavelength range between 1.52 micrometer and 1.62 micrometer, optical amplifiers such as EDFAs (not shown) may be employed to amplify the optical data signals at various distances along the fiber optic cable 215. As mentioned above, optical amplifiers at 1.31 micrometer are not yet commercially available today.

At the receiving end unit 210, the multiple-channel optical signal is demultiplexed at a wavelength division multiplexer/demultiplexer 270. It is appreciated that the multiplexer/demultiplexer 270 may be similar to the multiplexer/demultiplexer 265 since the same type of device may serve as either a multiplexer or a demultiplexer.

At the output of the multiplexer/demultiplexer 270, combined beams of light at different channel wavelengths $\lambda_1, \lambda_2, \lambda_3, \ldots \lambda_N$ are distributed to a series of N tunable optical filters 280 which are operatively associated with a series of N optical receivers 285. Each tunable optical filter in the series of N tunable optical filters 280 is preferably operative to tune an optical receiver in the series of N optical receivers 285 associated therewith to a specific channel wavelength by filtering all other channel wavelengths. As mentioned above with reference to FIG. 1A, the series of N tunable optical filters 280 may include conventional tunable interferometers, such as Fabry-Perot interferometers. The series of N optical receivers 285 may include conventional photodetectors, such as avalanche photodiodes (APDs) or P-I-N photodiodes.

The control data signals, if generated, are also demultiplexed at the multiplexer/demultiplexer 270 and are provided to a tunable optical filter 290 which is operatively associated with a control data optical receiver 295. The tunable optical filter 290 is preferably operative to tune the control data optical receiver 295 to a control channel wavelength by filtering all other channel wavelengths.

The output of the series of N optical receivers 285 includes a replica of the electronic data signals originating from the data sources 220 at the transmitting end unit 205. Similarly, the output of the control data optical receiver 295 includes a replica of the control data signals originating from the control data source 250 at the transmitting end unit 205. Preferably, the electronic data signals regenerated at the series of N optical receivers 285 and the control data signals regenerated at the control data optical receiver 295 are provided to a switching unit 300 which may be similar to the switching unit 225 at the transmitting end unit 205.

At the switching unit 300, the regenerated electronic data signals are preferably detected at least some of N data sensors 305 which may be similar to the N data sensors 230 in the switching unit 225. The control data signals are preferably detected at a control data sensor 310 which may be similar to the control data sensor 245 in the switching unit 225.

Preferably, each of the N data sensors 305 is operative to generate an indication in response to detection of data carried over a channel associated therewith. The N data sensors 305 are preferably operatively associated with a controller 315 which is also comprised in the switching unit 300 and is similar to the controller 235 in the switching unit 225.

Preferably, the controller 315 is operative to receive indications from any of the N data sensors 305 that detect data carried over the channels associated therewith. The controller 315 also preferably receives an indication that control data signals are detected at the control data sensor 310 and the regenerated control data signals. Preferably, the controller 315 processes all the indications and employs the regenerated control data signals to output to a router 320 identification signals or codes identifying channel wavelengths over which the regenerated electronic data signals are received, and control signals controlling distribution of the regenerated electronic data signals to selected network elements (not shown), such as splitters, switches, routers and appliances. The router 320 is preferably operative to selectively distribute the regenerated electronic data signals to the selected network elements.

It is appreciated that the N data sensors 305, the controller 315, the router 320, and the control data sensor 310 may be comprised in a single integrated circuit. Alternatively or additionally, the N data sensors 305 may be comprised in a single sensor device (not shown) including a data sensor which scans all the N channels associated with the N data sensors 305 and generates addressed indications indicating data passage via channels, and channel numbers or channel addressing codes corresponding to the channels via which the data passes.

Preferably, the controller 315 may also generate control data signals and feedback signals indicating a quality of reception of data received over at least some of the N channel wavelengths at the receiving end 210. The control data signals and feedback signals are preferably transmitted back to the transmittingend unit 205 via a control data optical transmitter 325. The control data signals and feedback signals transmitted by the control data optical transmitter 325 are preferably multiplexed at the multiplexer/demultiplexer 270 and transmitted over the fiber optic cable 215 to the transmitting end unit 205.

At the transmitting end unit 205, the control data signals and feedback signals originating from the receiving end unit 210 are preferably demultiplexed at the multiplexer/demultiplexer 265, and tuned and regenerated at a tunable optical filter 330 and an optical receiver 335 respectively. The regenerated control data signals and feedback signals are preferably provided to the controller 235 via the control data sensor 245. Preferably, the regenerated control data signals and feedback signals are employed by the controller 235 for feedback to the data sources 220 as described herein below.

It is appreciated that the control channel is no different than a data channel. Accordingly, data signals, control signals, and combined data signals and control signals may be communicated over the control channel according to the communication protocol implemented.

As mentioned above, communication performance of prior art optical communication systems utilizing DWDM may degrade over time due to changes, such as temperature changes and drifts in wavelength characteristics of optoelectric components over time. Preferably, the optical communication system 200 may be operative to improve communication performance in any of the following distinct cases and in any combination thereof:

(1) not all the N channels are carrying data simultaneously and communication performance of some channels that carry data is low;
(2) time dependent changes, such as temperature changes, cause degradation in communication performance; and
(3) actual capacities of at least some of the N channels are lower than a maximum attainable channel capacity and communication performance of some of the channels that carry data is low.

The operation of the apparatus of FIG. 2 is now briefly described with reference to the above mentioned cases in which the optical communication system 200 may improve communication performance.

Preferably, in case (1) only K out of N channels are carrying data, where K is less than N. Accordingly, the controller 235 receives from K data sensors K indications indicating that a first sub-group of K out of N channels are carrying data. The controller 235 then processes the K indications and preferably provides to the router 240 identification signals or codes determining a second sub-group of K channels. The controller 235 may also provide directing instructions for redirecting the data carried over the K channels in the first sub-group of K channels to the K channels in the second sub-group of K channels.

Preferably, the second sub-group of K channels is operatively associated with K optical transmitters from the N optical transmitters 255. Since the K optical transmitters are operative to transmit data over K channel wavelengths, determination of the second sub-group of K channels also provides determination of a sub-group of K channel wavelengths which corresponds to the second sub-group of K channels and vice versa.

Preferably, the controller 235 may select the second sub-group of K channels based on requirements derived from changes in operating conditions of the N optical transmitters 255, such conditions including, for example, malfunction or instability of some of the N optical transmitters 255. Thus, if at a certain time, some of the N optical transmitters 255 are inoperative, channels associated with the inoperative optical transmitters will not be selected to be part of the second sub-group of K channels at that time.

Alternatively or additionally, the second sub-group of K channels may be selected based on a selection of the corresponding sub-group of K channel wavelengths which provides a distribution of channel wavelengths characterized by that a highest number of channel wavelengths in the corresponding sub-group of K channel wavelengths are spaced at least $S_1$ nm from at least one nearest neighbor channel wavelength in the corresponding sub-group of K channel wavelengths, where $S_2$ is greater than $S_1$.

It is appreciated that the increase in channel spacing from $S_1$ nm to $S_2$ nm reduces interference between channel wavelengths in the sub-group of K channel wavelengths corresponding to the second sub-group of K channels. Additionally, the probability that drifts in wavelength characteristics of optoelectric components over time may cause overlap between channel wavelengths spaced $S_2$ nm from each other is lower than the probability of generation of overlap between channel wavelengths spaced $S_1$ nm from each other.

The increase in channel spacing from $S_1$ nm to $S_2$ nm results from the operation of the switching unit 225 and the corresponding switching unit 300. A result of such operation of the switching unit 225 is illustrated in FIG. 3 which is a generalized block diagram illustration of a simplified example of a configuration of the optical communication system 200 of FIG. 2 constructed and operative in accordance with a preferred embodiment of the present invention.

Figure 3:
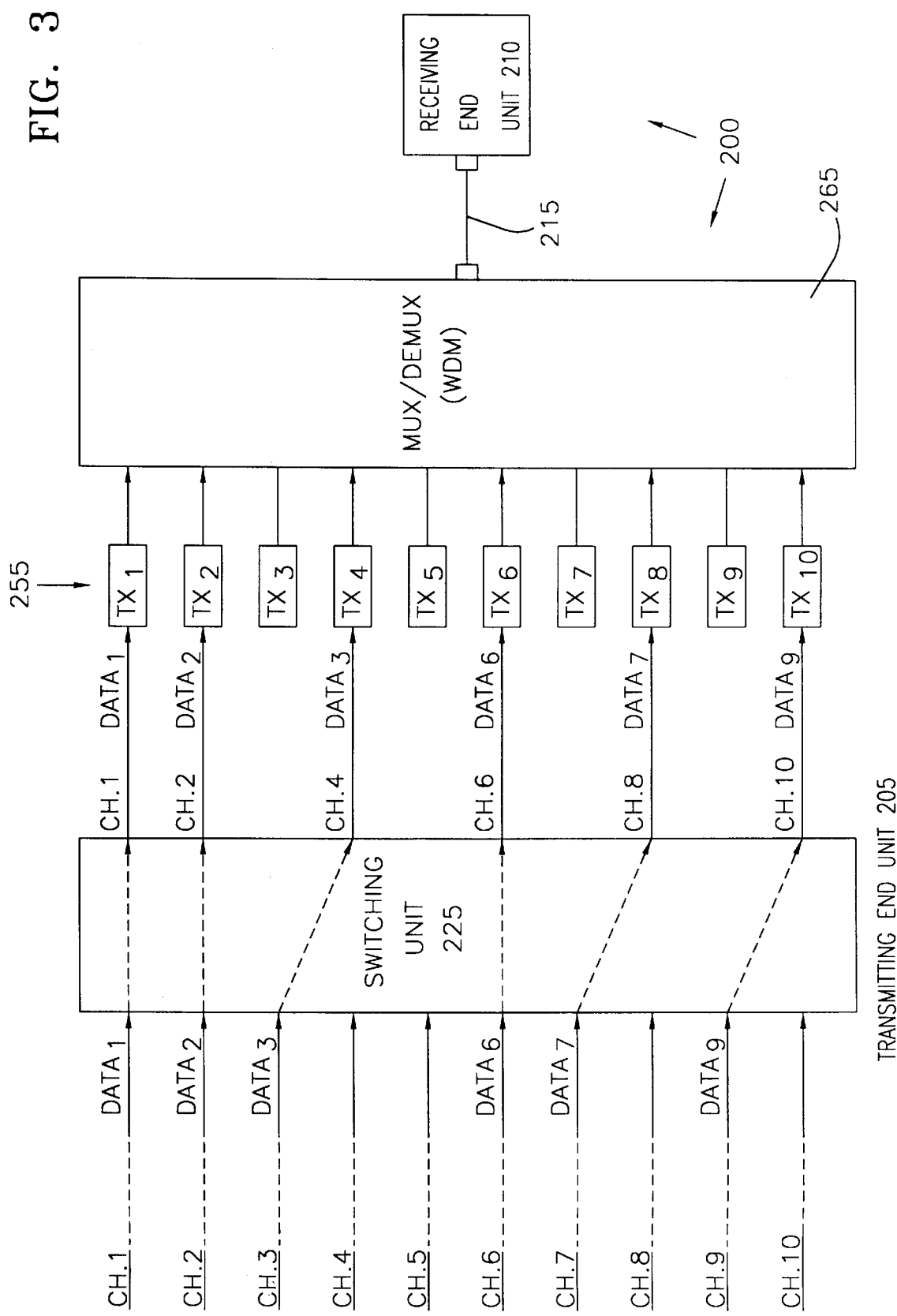
FIG. 3 is a generalized block diagram illustration of a simplified example of a configuration of the optical communication system of FIG. 2 constructed and operative in accordance with a preferred embodiment of the present invention.

In the simplified configuration of the optical communication system 200 illustrated in FIG. 3, the transmitting end unit 205 includes ten channels (N=10) over which data signals may be carried, and ten optical transmitters 255 indicated $TX_1$, $TX_2$, $TX_3$, $TX_4$, $TX_5$, $TX_6$, $TX_7$, $TX_8$, $TX_9$, and $TX_{10}$. Preferably, the channel spacing $S_1$ between adjacent channel wavelengths used by the ten optical transmitters 255 to transmit optical data signals is 0.8 nm.

In the configuration of FIG. 3, only six out of the ten channels (K=6) carry data signals to be transmitted to the receiving end unit 210 over the fiber optic cable 215. The six channels carrying data preferably form a first sub-group of six channels which includes the channels numbered 1, 2, 3, 6, 7 and 9.

Preferably, the switching unit 225 senses six data streams $DATA_1$, $DATA_2$, $DATA_3$, $DATA_6$, $DATA_7$, and $DATA_9$ carried over the channels 1, 2, 3, 6, 7 and 9 respectively, and routes the six data streams $DATA_1$, $DATA_2$, $DATA_3$, $DATA_6$, $DATA_7$, and $DATA_9$ to a second sub-group of six channels which includes the channels 1, 2, 4, 6, 8 and 10. The data streams carried over the six channels in the second sub-group modulate the six optical transmitters $TX_1$, $TX_2$, $TX_4$, $TX_6$, $TX_8$, and $TX_{10}$ emitting optical signals at channel wavelengths $\lambda_1$, $\lambda_2$, $\lambda_4$, $\lambda_6$, $\lambda_8$, and $\lambda_{10}$, respectively. Thus, the second sub-group of six channels corresponds to a sub-group of six channel wavelengths including the channel wavelengths $\lambda_1$, $\lambda_2$, $\lambda_4$, $\lambda_6$, $\lambda_8$, and $\lambda_{10}$.

The second sub-group of six channels which includes the channels 1, 2, 4, 6, 8 and 10 and the corresponding six channel wavelengths $\lambda_1$, $\lambda_2$, $\lambda_4$, $\lambda_6$, $\lambda_8$, and $\lambda_{10}$ form a distribution of channel wavelengths characterized by that a highest number of channel wavelengths, i.e. five channel wavelengths, are spaced at least $S_2$ nm from at least one nearest neighbor channel wavelength in the sub-group of six channel wavelengths $\lambda_1$, $\lambda_2$, $\lambda_4$, $\lambda_6$, $\lambda_8$, and $\lambda_{10}$.

As mentioned above with reference to FIG. 2, output beams from the six optical transmitters $TX_1$, $TX_2$, $TX_4$, $TX_6$, $TX_8$, and $TX_{10}$ emitting at the channel wavelengths $\lambda_1$, $\lambda_2$, $\lambda_4$, $\lambda_6$, $\lambda_8$, and $\lambda_{10}$ respectively are preferably multiplexed at the multiplexer/demultiplexer 265 and transmitted over the fiber optic cable 215 to the receiving end unit 210.

It is appreciated that in the configuration illustrated in FIG. 3, channel spacing between each of the channel wavelengths $\lambda_4$, $\lambda_6$, $\lambda_8$, and $\lambda_{10}$ and their nearest neighbor channel wavelengths is $S_2$=1.6 nm, i.e. twice the initial channel spacing $S_1$. The channel spacing between the channel wavelength $\lambda_2$ and one of the nearest neighbors channel wavelengths, i.e. $\lambda_4$, is also 1.6 nm, whereas the: channel spacing between the channel wavelength $\lambda_2$ and a second nearest neighbor channel wavelength, i.e. $\lambda_1$, is 0.8 nm.

If the switching unit 225 would have been removed from the configuration illustrated in FIG. 3, the channel wavelengths $\lambda_1$, $\lambda_2$, $\lambda_3$, $\lambda_6$, $\lambda_7$, and $\lambda_9$ would have been used for transmission of the optical data signals with channel spacing between: $\lambda_1$ and $\lambda_2$; $\lambda_2$ and $\lambda_3$; and $\lambda_6$ and $\lambda_7$ being $S_1$. However, after operating the switching unit 225 in the configuration illustrated in FIG. 3, channel spacing between four channel wavelengths is increased to $S_2$.

As mentioned above, the increased channel spacing between many of the channel wavelengths that are active reduces sensitivity to interference and drifts in wavelength characteristics of optoelectric devices operating at the active channel wavelengths and thus improves communication performance.

It is appreciated that in a general case in which N is the total number of available channels or channel wavelengths, and K determines the size of a sub-group of active channels or channel wavelengths where K<N, $S_2$ may be determined by the formula: $S_2=S_1*(N/K+1)$, where N/K is a division of integers whose result is an integer. In such a case, the highest number of channel wavelengths NCW which are spaced at least $S_2$ nm from at least one nearest neighbor channel wavelength in the sub-group of K channel wavelengths is:

$$NCW = N - K + 1 \quad \text{if } N + 1 < 2*K; \text{ and}$$

$$NCW = K \quad \text{if } N + 1 > 2*K \text{ or } N + 1 = 2*K.$$

It is appreciated that other appropriate types of distributions which result in an increase in channel spacing between at least some of the active channel wavelengths may alternatively be implemented. It is also appreciated that the selection of the distribution mentioned above is not meant to be limiting.

Preferably, the optical transmitters 255 that are not used for transmission of data are not driven by data signals and are thus turned-off. In a case that external modulation is employed, external modulators (not shown) associated with the optical transmitters 255 that are not used for transmission of data may be activated to block output of light beams from the optical transmitters 255 that are not used for transmission of data. Alternatively, the optical transmitters 255 that are not used for transmission of data may be left on continuously thereby generating continuous constant level signals which may be easily filtered at the receiving end unit 210 by conventional DC signals filtering methods.

The operation of the apparatus of FIG. 2 is now briefly described with reference to case (2) in which time dependent changes, such as temperature changes, cause degradation in communication performance.

Preferably, if a quality of reception of data received over at least one of the N channel wavelengths at the receiving end unit 210 is below a threshold, the controller 315 generates a reception indicator indicating that the quality of reception of data received over the at least one of the N channel wavelengths at the receiving end unit 210 is below the threshold. Preferably, the controller 315 transmits the reception indicator to the optical receiver 335 at the transmitting end unit 205 via the control channel using the control data optical transmitter 325.

The optical receiver 335 preferably provides the reception indicator to the controller 235 which is preferably operative to generate a determination that a channel hop from the at least one of the N channel wavelengths to at least one unoccupied channel wavelength must be performed in response to reception of the reception indicator. It is appreciated that the unoccupied channel wavelength is preferably spaced at least $S_2$ nm from the at least one of the N channels. Alternatively, the unoccupied channel wavelength may be spaced at least $S_1$ nm from the at least one of the N channels.

Preferably, the determination that the channel hop must be performed is provided from the transmitting end unit 205 to the receiving end unit 210 and the hop is preferably performed at the transmitting end unit 205 and at the receiving end unit 210 in synchronization, under control of the controllers 235 and 315 respectively. It is appreciated that the hop may be performed by the routers 240 and 320 respectively which may route the data carried over the at least one of the N channel wavelengths to the at least one unoccupied channel wavelength in accordance with instructions provided by the controllers 235 and 315 respectively. Alternatively, the hop may be performed by any appropriate conventional wavelength converters (not shown) at the transmitting end unit 205 and at the receiving end unit 210 under control of the controllers 235 and 315 respectively.

It is further appreciated that the at least one unoccupied channel wavelength is preferably a channel wavelength which is not interfered and thus communication performance is improved.

If the optical communication system 200 is implemented in a case which does not require amplification, such as in cable-TV systems communicating over short distances, each of the N channel wavelengths may be comprised in a wavelength range between 1.52 micrometer and 1.62 micrometer, the control channel wavelength may operate at a wavelength around 1.31 micrometer, and the data signals carried over the N channel wavelengths operating in the wavelength range between 1.52 micrometer and 1.62 micrometer may be multiplexed with the control signals carried over the control channel wavelength operating at the wavelength around 1.31 micrometer for transmission in a wavelength division multiplexed form. In such a case, the optical receiver 335 is preferably an optical receiver operating at 1.31 micrometer, the optical transmitter 325 is preferably an optical transmitter transmitting at 1.31 micrometer, and the reception indicator is received over the control channel wavelength operating at the wavelength around 1.31 micrometer.

Alternatively, if the control channel is not used for transmission of control signals, such as in a case that control signals are combined with data signals and transmitted in a combined form over the channels carrying data, or during periods that the control channel is not in use, the controller 235 may be operative to determine the hop from one of the N channel wavelengths to the control channel wavelength operating at a wavelength around 1.31 micrometer. In such a case, all the N channels may initially carry data, and the control channel may be left vacant for enabling hopping to the control channel in case of interference between two of the N channels.

It is appreciated that the control channel may be alternatively operated at other channel wavelengths, such as at channel wavelengths around 1.48 micrometer or 1.51 micrometer.

Preferably, the concept of channel hopping from an interfered channel wavelength to an unoccupied channel wavelength which is not interfered may be also suitable in a case that the optical data signals are transmitted in a polarized form so that a channel wavelength may carry two data streams over two polarized carrier light beams. In such a case, each channel wavelength may include two polarized channels, and at times that one of the polarized channels interferes with the another channel, the controller 235 may be operative to determine a hop from one of the polarized channels to an unoccupied channel wavelength.

Preferably, when the controller 235 receives the reception indicator indicating a low quality of reception at least one of the N channel wavelengths at the receiving end unit 210, an improvement in commutation performance may alternatively or additionally be obtained by reducing a data rate of the data carried over the at least one of the N channel wavelengths. In such a case, upon receiving the reception indicator, the controller 235 is preferably operative to transmit an instruction to reduce a data rate of the data carried over the at least one of the N channel wavelengths to those of the N data sources 220 that transmit the data carried over the at least one of the N channel wavelengths. Preferably, those of the N data sources 220 that transmit the data carried over the at least one of the N channel wavelengths may be operative to reduce the data rate of the data carried over the respective channel wavelengths in response to the instruction received from the controller 235. It is appreciated that in some cases, a data rate reduction by a factor of 2 may improve communication performance by a factor of 4.

Referring now to case (3) in which actual capacities of at least L out of N channels (K<L<N or L=N) are lower than a maximum attainable channel capacity, the at least L channels may preferably be condensed to form the first sub-group of K channels prior to the detection of the electronic data signals at the N data sensors 230. Thus, the data carried over the L channels may be transmitted over a number of channel wavelengths which is less than L, but at higher data rates. As mentioned above, when the number of channel wavelengths is decreased and the channel wavelengths are adequately spaced, the probability of interference decreases and communication performance is improved.

The maximum attainable channel capacity is typically determined by the characteristics of the optoelectric components of the optical communication system 200. Specifically, the maximum attainable channel capacity may depend upon at least one of the following parameters: modulation speed of the optical transmitters 255; time demultiplexing speed, i.e. speed of separation of one channel from many others within a tie-multiplexed multichannel signal; and receiver electronics clock synchronization time. It is appreciated that other parameters may also determine the maximum attainable channel capacity.

Preferably, the at least L channels may be radio frequency (RF) channels that carry electronic data signals at data rates which are lower than the maximum attainable channel capacity, and condensation of the L channels may be performed by electronically directing data carried over L–K channels to at least some of the K channels thereby increasing a data rate of data carried over at least one of the K channels. It is appreciated that the condensation process may be performed at the data sources 220.

Figure 4:
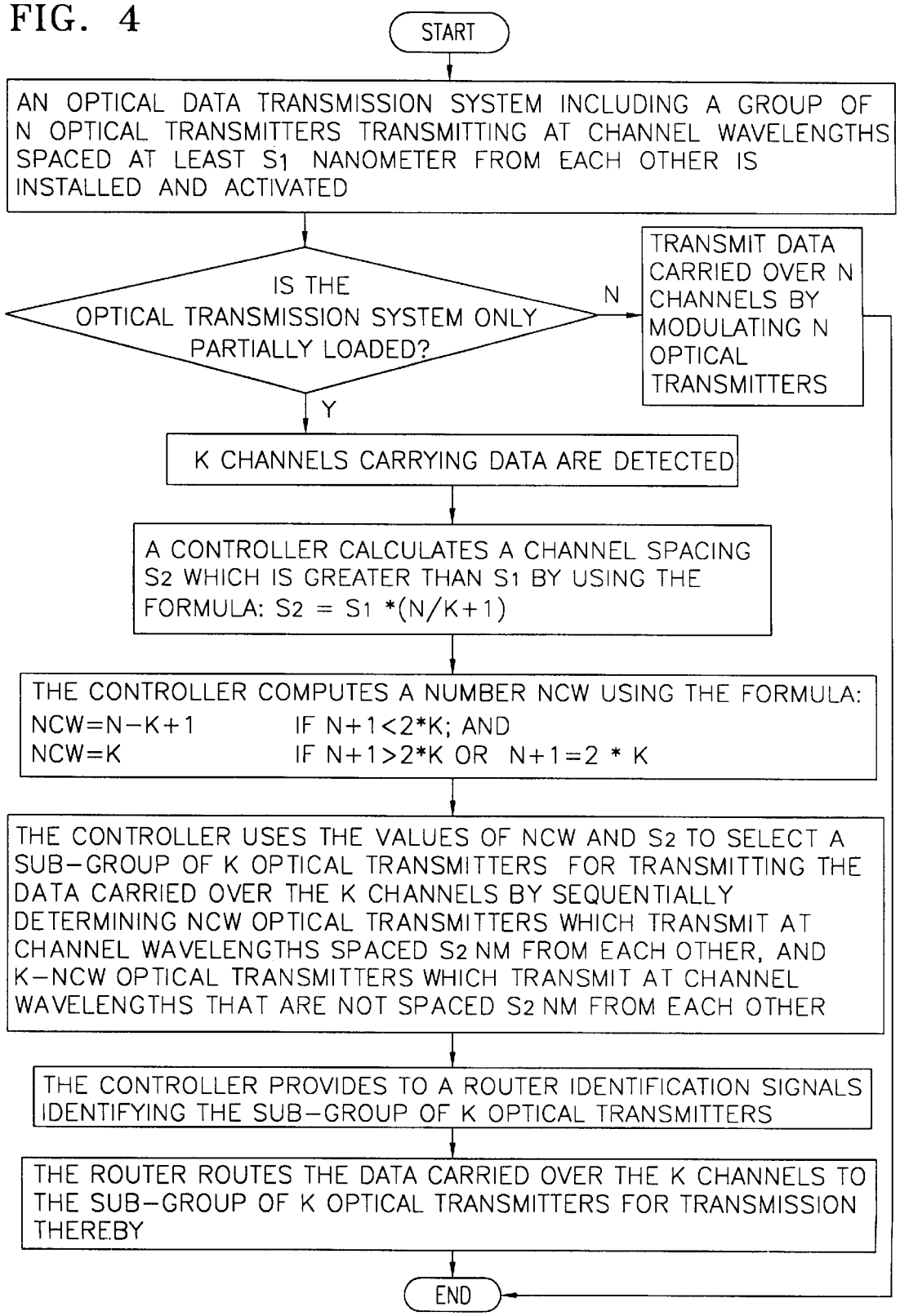
FIG. 4 is a simplified flow chart illustration of a preferred method of operation of the apparatus of FIGS. 2 and 3.

Reference is now made to FIG. 4 which is a simplified flow chart illustration of a preferred method of operation of the apparatus of FIGS. 2 and 3.

Preferably, an optical transmission system including a group of N optical transmitters transmitting at channel wavelengths spaced at least $S_1$ nm from each other is installed and activated. When the system is operated in full capacity, all the N channels carry data, and the data carried over the N channels is preferably used to modulate all the N optical transmitters.

When the optical transmission system is only partially loaded, i.e. only K out of the N channels carry data, the K channels carrying data are preferably detected at a switching unit comprised in the optical transmission system.

After detection of the K channels carrying data, a controller at the switching unit calculates a channel spacing $S_2$ which is greater than $S_1$ by using the formula: $S_2=S_1*(N/K+1)$, where N/K is a division of two integers. Additionally, the controller also computes a number NCW, where NCW characterizes a distribution of channel wavelengths in which NCW channel wavelengths in a sub-group of K channel wavelengths corresponding to the K channels are spaced at least $S_2$ nm from at least one nearest neighbor channel wavelength in the sub-group of K channel wavelengths.

Preferably, NCW is calculated using the formula:

$$NCW = N - K + 1 \quad \text{if } N + 1 < 2*K; \text{ and}$$

$$NCW = K \quad \text{if } N + 1 > 2*K \text{ or } N + 1 = 2*K.$$

After computing the values of NCW and $S_2$, the controller may preferably use die values of NCW and $S_1$ to select a sub-group of K optical transmitters for transmitting the data carried over the K channels. Preferably, selection of the sub-group of K optical transmitters may be performed by sequentially determining a number of NCW optical transmitters which transmit at channel wavelengths spaced $S_2$ nm from each other, and then determining the rest of K-NCW optical transmitters which transmit at channel wavelengths that are not spaced $S_2$ nm from each other.

Preferably, after the controller determines the sub-group of K optical transmitters, the controller provides to a router in the switching unit identification signals or codes identifying the sub-group of K optical transmitters. The routes preferably routes the data carried over the K channels to the sub-group of K optical transmitters for transmission thereby.

Figure 5:
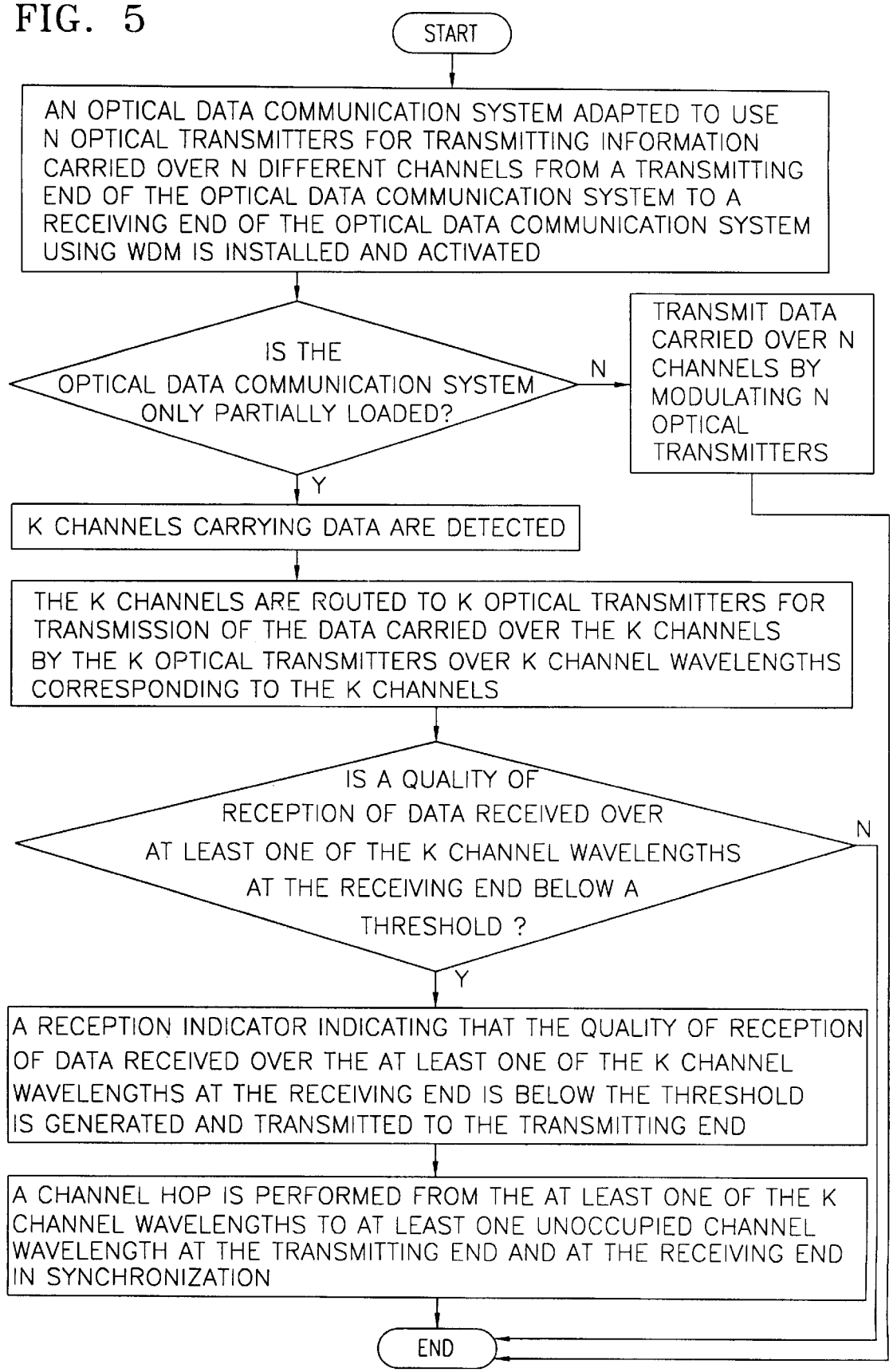
FIG. 5 is a simplified flow chart illustration of another preferred method of operation of the apparatus of FIG. 2.

Reference is now made to FIG. 5 which is a simplified flow chart illustration of another preferred method of operation of the apparatus of FIG. 2.

Preferably, an optical data communication system adapted to use N optical transmitters for transmitting information carried over N different channels from a transmitting end of the optical data communication system to a receiving end of the optical data communication system using WDM is installed and activated. When the system is operated in full capacity, all the N channels carry data, and the data carried over the N channels is preferably used to modulate all the N optical transmitters.

When the optical data communication system is only partially loaded, i.e. only K out of the N channels carry data, the K channels carrying data are preferably detected and routed to K optical transmitters for transmission of the data carried over the K channels by the K optical transmitters over K channel wavelengths corresponding to the K channels. It is appreciated that the K optical transmitters are selected from the N optical transmitters.

If a quality of reception of data received over at least one of the K channel wavelengths at the receiving end is determined to be below a threshold, a reception indicator indicating that the quality of reception of data received over the at least one of the K channel wavelengths at the receiving end is below the threshold is preferably generated and transmitted back to the transmitting end.

Preferably, when the reception indicator is received at the transmitting end, a channel hop is performed from the at least one of the K channel wavelengths to at least one unoccupied channel wavelength at the transmitting end and at the receiving end in synchronization. It is appreciated that the synchronization may be obtained by communicating a time when the hop is to be performed between the transmitting end and the receiving end, and performing the hop at the same time at the transmitting end and at the receiving end.

Figure 6:
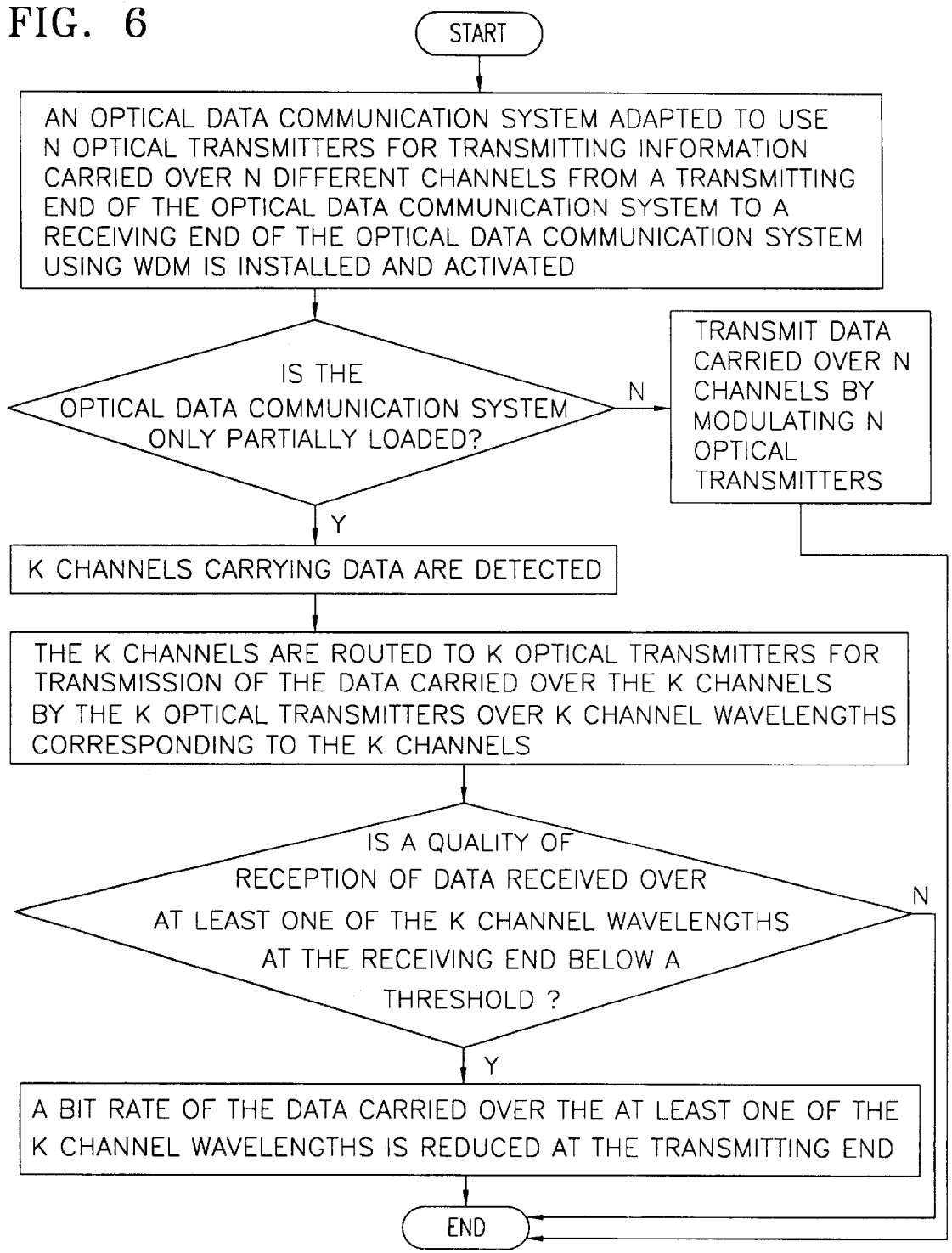
FIG. 6 is a simplified flow chart illustration of yet another preferred method of operation of the apparatus of FIG. 2.

Reference is now made to FIG. 6 which is a simplified flow chart illustration of yet another preferred method of operation of the apparatus of FIG. 2.

The method described in FIG. 6 is substantially similar to the method described with reference to FIG. 5 except that rather than communicating a reception indicator and performing a channel hop in response to reception of the reception indicator at the transmitting end, a data rate of the data carried over the at least one of the K channels whose reception is below the threshold is reduced at the transmitting end.

Figure 7:
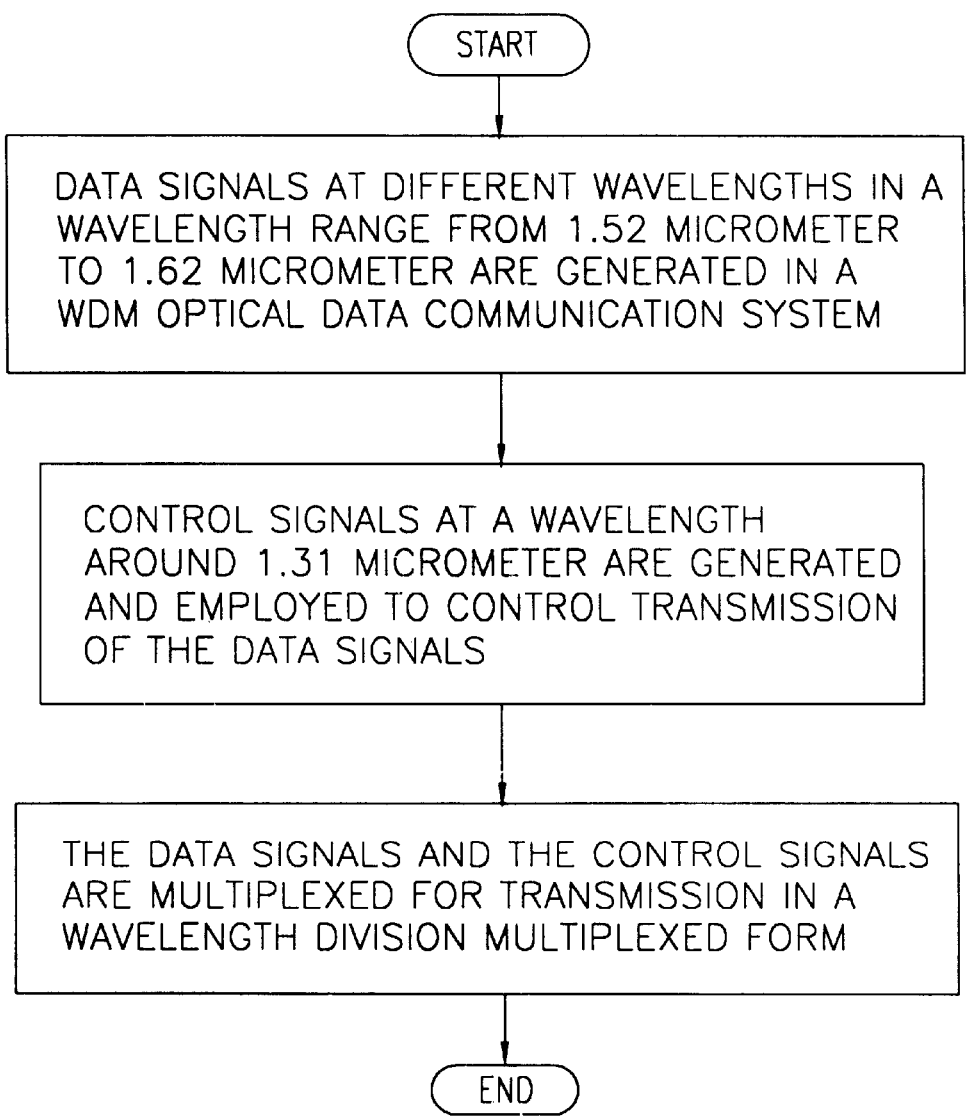
FIG. 7 is a simplified flow chart illustration of still another preferred method of operation of the apparatus of FIG. 2.

Reference is now made to FIG. 7 which is a simplified flow chart illustration of still another preferred method of operation of the apparatus of FIG. 2.

Preferably, in a WDM optical data communication system, data signals at different wavelengths in a wavelength range between 1.52 micrometer and 1.62 micrometer are generated. Additionally, control signals at a wavelength around 1.31 micrometer are also generated. It is appreciated that the control signals are preferably employed for controlling transmission of the data signals.

Preferably, the data signals and the control signals are multiplexed for transmission in a wavelength division multiplexed form. Thus, at a receiving red end of the WDM optical data communication system, received optical signals include optical signals in a range between 1.52 micrometer and 1.62 micrometer combined with optical signals at 1.31 micrometer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described herein above. Rather the scope of the invention is defined only by the claims which follow.

What is claimed is:

1. A method of transmitting data carried over K channels via an optical transmission system including a group of N optical transmitters transmitting at channel wavelengths spaced at least $S_1$ nm from each other, where K is less than N, the method comprising:

detecting the K channels carrying data; and routing the K channels to a sub-group of K optical transmitters selected from the group of N optical transmitters to provide a distribution of the K optical transmitters in which a highest number of optical transmitters in said sub-group transmit at channel wavelengths spaced at least $S_2$ nm from channel wavelengths used by at least one nearest neighbor optical transmitter in the sub-group, where $S_2$ is greater than $S_1$.

2. A method according to claim 1 and wherein $S_2=S_1*(N/K+1)$.

3. A method according to claim 1 and also comprising the steps of:

determining that a quality of reception of data received over at least one of K channel wavelengths at a receiving end is below a threshold, wherein the K channel wavelengths respectively correspond to the K channels;

transmitting to the optical transmission system, in response to said determining step, a reception indicator indicating that the quality of reception of data received over said at least one of the K channel wavelengths at the receiving end is below the threshold; and hopping from said at least one of the K channel wavelengths to at least one unoccupied channel wavelength at the transmission system and at the receiving end in synchronization.

4. A method according to claim 3 and wherein each optical transmitter in said group of N optical transmitters operates at a wavelength in a wavelength range between 1.52 micrometer and 1.62 micrometer, and said transmitting step comprises the step of:

transmitting said reception indicator over a control channel operating at a wavelength around 1.31 micrometer.

5. A method according to claim 3 and wherein each optical transmitter in said group of N optical transmitters operates at a wavelength in a wavelength range between 1.52 micrometer and 1.62 micrometer, and said hopping step comprises the step of:

hopping from said at least one of the K channel wavelengths to at least one channel wavelength centered around 1.31 micrometer at the optical transmission system and at the receiving end in synchronization.

6. A method according to claim 1 and also comprising the steps of:

determining that a quality of reception of data received over at least one of K channel wavelengths at a receiving end is below a threshold, wherein the K channel wavelengths respectively correspond to the K channels;

transmitting to the optical transmission system, in response to said determining step, a reception indicator indicating that the quality of reception of data received over said at least one of the K channel wavelengths at the receiving end is below the threshold; and reducing a data rate of the data carried over said at least one of the K channel wavelengths at the optical transmission system.

7. A method according to claim 1 and also comprising the step of condensing L radio frequency (RF) channels carrying data into said K channels prior to said detecting step, wherein L is greater than K and less than or equal to N.

8. A method according to claim 7 and wherein said condensing step comprises the step of transferring data carried over at least one of the L channels that is not included in the K channels to at least one of said K channels.

9. A method according to claim 1 and wherein said routing step comprises the step of obtaining said highest number of optical transmitters in said sub-group, being indicated as NCW, as follows:

$NCW = N - K + 1$ if $N + 1 < 2*K$; and $NCW = K$ if $N + 1 \geq 2*K$.

10. In an optical data communication system adapted to use N optical transmitters for transmitting information carried over N different channels from a transmitting end of the communication system to a receiving end of the communication system using wavelength-division multiplexing (WDM), a method of transmitting data carried over K out of the N channels, the method comprising:

detecting the K channels carrying data;

routing the K channels to K optical transmitters for transmission of the data carried over the K channels by the K optical transmitters over K channel wavelengths corresponding to the K channels, wherein said K optical transmitters are selected from the N optical transmitters;

determining that a quality of reception of data received over at least one of the K channel wavelengths at the receiving end is below a threshold;

transmitting to the transmitting end, in response to said determining step, a reception indicator indicating that the quality of reception of data received over said at least one of the K channel wavelengths at the receiving end is below the threshold; and hopping from said at least one of the K channel wavelengths to at least one unoccupied channel wavelength at the transmitting end and at the receiving end in synchronization.

11. A method according to claim 10 and wherein each of said N optical transmitters operates at a wavelength m a wavelength range between 1.52 micrometer and 1.62 micrometer, and said transmitting step comprises the step of transmitting said reception indicator over a control channel operating at a wavelength around 1.31 micrometer.

12. A method according to claim 10 and wherein each of said N optical transmitters operates at a wavelength in a wavelength range between 1.52 micrometer and 1.62 micrometer, and said hopping step comprises the step of hopping from said at least one of the K channel wavelengths to at least one channel wavelength centered around 1.31 micrometer at the transmitting end and at the receiving end in synchronization.

13. The method according to claim 10 and wherein said hopping comprises:

communicating a time between the transmitting end and the receiving end; and hopping from said at least one of the K channel wavelengths to said at least one unoccupied channel wavelength at the transmitting end and at the receiving end at said time.

14. A transmission method for use in a WDM optical data communication system, the method comprising:

generating data signals at different wavelengths in a wavelength range between 1.52 micrometer and 1.62 micrometer;

detecting K channel wavelengths carrying said data signals;

routing the K channel wavelengths to a sub-group of K optical transmitters, selected from a group of N optical transmitters operating at channel wavelengths spaced at least $S_1$ nm from each other, to provide a distribution of the K optical transmitters in which a highest number of optical transmitters in said sub-group transmit at channel wavelengths spaced at least $S_2$ nm from channel wavelengths used by at least one nearest neighbor in the sub-group, where $S_2$ is greater than $S_1$;

generating control signals at a wavelength around 1.31 micrometer for controlling transmission of said data signals; and multiplexing said data signals and said control signals for transmission in a wavelength division multiplexed form.

15. A switching unit for use in an optical data communication system which communicates data provided over N channels via N different channel wavelengths spaced at least $S_1$ nm from each other, the switching unit comprising:

N data sensors, each operatively associated with one of said N channels, and each operative to generate an indication in response to detection of data carried over a channel associated therewith;

a router operative to selectively route signals; and a controller operatively associated with said N data sensors and said router and operative to receive from K data sensors K indications indicating that a first sub-group of K out of the N channels carry data, and to provide to the router at least identification signals determining a second sub-group of K channels, the second sub-group of K channels corresponding to a sub-group of K out of the N channel wavelengths used by K optical transmitters to transmit the data carried over the K channels.

16. Apparatus according to claim 15 and wherein said second sub-group of K channels is selected based on a selection of the corresponding sub-group of K channel wavelengths which provides a distribution of channel wavelengths characterized by that a highest number of channel wavelengths in the corresponding sub-group of K channel wavelengths are spaced at least $S_2$ nm from at least one nearest neighbor channel wavelength in the sub-group of K channel wavelengths, where $S_2$ is greater than $S_1$.

17. Apparatus according to claim 15 and wherein said N data sensors, said router, and said controller are comprised in a single integrated circuit.

18. Apparatus according to claim 15 and also comprising:

a receiver operatively associated with said controller and operative to receive a reception indicator indicating that a quality of reception of data received over at least one of the K channel wavelengths at a receiving end is below a threshold, wherein said controller is also operative to determine a channel hop from said at least one of the K channel wavelengths to at least one unoccupied channel wavelength.

19. Apparatus according to claim 15 and also comprising:

a receiver operatively associated with said controller and operative to receive a reception indicator indicating that a quality of reception of data received over at least one of the K channel wavelengths at a receiving end is below a threshold, wherein said controller is also operative to cause a reduction of a data rate of the data carried over said at least one of the K channel wavelengths in response to reception of the reception indicator.

20. Apparatus according to claim 15 and wherein said router is operatively associated with N optical transmitters transmitting over said N channel wavelengths, and said router is also operative to selectively route signals for modulating at least one of input currents to and output beams of K out of the N optical transmitters under control of said controller, the K optical transmitters being associated with said K channel wavelengths.

21. Apparatus according to claim 15 and wherein said N channels are operatively associated with N optical receivers, said router is operatively associated with said N optical receivers and said router is also operative to selectively route signals received from at least some of the N optical receivers, and said controller is also operative to provide to the router identification signals determining K out of the N optical receivers associated with said K channel wavelengths.

22. The apparatus according to claim 15 and wherein said N data sensors are comprised in a single sensor device that is operative to scan the N channels and to generate at least one of the following: at least one addressed indication indicating data passage via at least one of said N channels; at least one channel number corresponding to at least one of said N channels via which data passes; and at least one channel addressing code corresponding to at least one of said N channels via which data passes.

23. A method of transmitting data carried over K channels to a receiving end via an optical transmission system including N optical transmitters capable of transmitting over N channel wavelengths, where K is less than N and the K channels correspond to a first set of K optical transmitters transmitting over a first sub-group of K out of the N channel wavelengths, the method comprising:

determining that a quality of reception at the receiving end over at least one channel wavelength in the first sub-group of K channel wavelengths is below a threshold;

selecting a second sub-group of K out of the N channel wavelengths based upon at least one requirement derived from at least one change in operating conditions of at least one of the N optical transmitters transmitting over at least one of the N channel wavelengths; and routing the K channels carrying the data to a second set of K optical transmitters transmitting over said second sub-group of K out of the N channel wavelengths.

24. A method of transmitting data carried over N channels in an optical communication system that is adapted to use N optical transmitters for transmitting the data carried over the N channels over N channel wavelengths corresponding to said N channels from a transmitting end of the communication system to a receiving end of the communication system using WDM, the method comprising:

determining that a quality of reception of data over at least one of the N channel wavelengths at the receiving end is below a threshold;

transmitting a reception indicator indicating that said quality of reception of data over said at least one of the N channel wavelengths at the receiving end is below the threshold; and reducing a data rate of data transmitted over said at least one of the N channel wavelengths in response to said transmitting.

25. The method according to claim 24 and wherein said reducing comprises:

instructing at least one data source associated with at least one of the N channels corresponding to said at least one of the N channel wavelengths to reduce a data rate of data transmitted over said at least one of the N channels; and reducing the data rate of data transmitted over said at least one of the N channels in response to said instructing thereby reducing said data rate of data transmitted over said at least one of the N channel wavelengths.

26. A method of transmitting data carried over K channels to a receiving end via an optical transmission system including N optical transmitters capable of transmitting over N channel wavelengths spaced at least $S_1$ nm from each other, where K is less than N and the K channels correspond to a first set of K optical transmitters transmitting over a first sub-group of K out of the N channel wavelengths, the method comprising:

determining that a quality of reception at the receiving end over at least one channel wavelength in the first sub-group of K channel wavelengths is below a threshold;

selecting a second sub-group of K out of the N channel wavelengths that includes a higher number of channel wavelengths being spaced at least $S_2$ nm from at least one nearest neighbor channel wavelength in the second sub-group than a number of channel wavelengths in said first sub-group that are spaced at least $S_2$ nm from at least one nearest neighbor channel wavelength in the first sub-group, where $S_2$ is greater than $S_1$; and routing the K channels carrying the data to a second set of K optical transmitters transmitting over said second sub-group of K out of the N channel wavelengths.

27. An optical communication system capable of communicating over N channel wavelengths spaced at least $S_1$ nm from each other by utilizing WDM, the system comprising:

a receiving end unit; and a transmitting end unit comprising a controller which is operative, in synchronization with the receiving end unit, to select a sub-group of K out of the N channel wavelengths and to effect communication over said sub-group of K channel wavelengths between the transmitting end unit and the receiving end unit, said sub-group being selected so as to include the highest number of channel wavelengths spaced at least $S_2$ nm from at least one nearest neighbor channel wavelength in said sub-group, where $S_2$ is greater than $S_1$.

28. A receiving end unit of an optical communication system, the receiving end unit comprising:

N optical receivers operatively associated, via N channel wavelengths multiplexed by WDM, with N optical transmitters at a transmitting end unit of the communication system, K out of said N optical receivers receiving data from K out of said N optical transmitters over K out of said N channel wavelengths, where K is less than N; and a controller operatively associated with said N optical receivers and operative to determine that a quality of reception over at least one of the K channel wavelengths is below a threshold, and to cause a channel hopping at the receiving end unit from said at least one of the K channel wavelengths to at least one unoccupied channel wavelength in synchronization with a corresponding channel hopping at the transmitting end unit in response to transmission to the transmitting end unit of a reception indicator indicating that said quality of reception is below the threshold.

29. The apparatus according to claim 28 and also comprising a router operatively associated with the controller and operative to perform said channel hopping caused by the controller.

30. The apparatus according to claim 28 and also comprising at least one wavelength converter operatively associated with the controller and operative to perform said channel hopping caused by the controller.

31. The apparatus according to claim 28 and wherein said controller is operative to cause said channel hopping in response to reception of an indication of a time when said channel hopping is to be performed.

32. An optical communication system capable of communicating over N channel wavelengths by utilizing WDM, the system comprising:

a transmitting end unit comprising N optical transmitters, K out of the N optical transmitters transmitting data over K out of said N channel wavelengths, where K is less than N; and a receiving end unit comprising:

N optical receivers, K out of the N optical receivers receiving the data transmitted by said K optical transmitters over said K channel wavelengths; and a controller operatively associated with said N optical receivers and operative to determine that a quality of reception over at least one of the K channel wavelengths is below a threshold, and to cause a channel hopping at the receiving end unit from said at least one of the K channel wavelengths to at least one unoccupied channel wavelength in synchronization with a corresponding channel hopping at the transmitting end unit in response to transmission to the transmitting end unit of a reception indicator indicating that said quality of reception is below the threshold.

33. In an optical data communication system adapted to use N optical transmitters for transmitting information carried over N different channels from a transmitting end of the communication system to a receiving end of the communication system using WDM, a method of transmitting data carried over K out of the N channels, the method comprising:

detecting the K channels carrying data;

routing the K channels to K optical transmitters for transmission of the data carried over the K channels by the K optical transmitters over K channel wavelengths corresponding to the K channels, wherein said K optical transmitters are selected from the N optical transmitters;

determining that a quality of reception of data received over at least one of the K channel wavelengths at the receiving end is below a threshold, and reducing a data rate of the data carried over said at least one of the K channel wavelengths at the transmitting end in response to said determining step.

* * * * *